UNITED STATES PATENT OFFICE.

LOUIS W. LUSCHER, OF KANSAS CITY, MISSOURI.

INDELIBLE INK.

1,320,631. Specification of Letters Patent. Patented Nov. 4, 1919.

No Drawing. Application filed July 10, 1919. Serial No. 309,868.

*To all whom it may concern:*

Be it known that I, LOUIS W. LUSCHER, a citizen of the United States, residing at Kansas City, in the county of Jackson and State of Missouri, have invented certain new and useful Improvements in Indelible Ink, of which the following is a specification.

This invention relates to indelible inks, and more especially to liquid compositions of the character named, for printing or writing on cloth, particularly those kinds of cloth which are cleansed by a washing operation, the object of my invention is the economical production of an indelible liquid ink, a further object being to produce an ink which is proof against thickening by guarding against material evaporization, a still further object being to produce an indelible liquid ink which will not corrode pen points or the like used for marking fabrics or other goods with the ink.

With these objects in view the invention consists in a composition composed of asphaltum or an equivalent base, carbon tetrachlorid and anilin oil, and to give the composition a pleasant odor bethyl salicylate (synthetic oil of wintergreen), or an equivalent may be employed.

In preparing the composition I prefer to use the ingredients in about the following proportions, viz: one dram of asphaltum, one ounce of carbon tetrachlorid, anilin oil in quantity of about one-half of the aggregate of asphaltum and carbon tetrachlorid and a small quantity of methyl salicylate, *i. e.*, enough to pleasantly scent the solution composed of asphaltum, carbon tetrachlorid and anilin oil. Good results may be obtained, however, if the proportions above given are varied within reasonable limits— in fact a somewhat smaller proportion of asphaltum may be found preferable for a fluid ink to be used chiefly for hand marking with a pen.

In producing the composition, the asphaltum is dissolved in the carbon tetrachlorid, and the resulting solution is of about the consistency of cream. To this solution one part of oil to two of the solution is added, and as the oil is introduced the solution is worked into a homogeneous mixture, preferably by mortar and pestle.

The dissolving of the asphaltum in the carbon tetrachlorid takes several hours, and the oil is added after the dissolving of the asphaltum has been completely effected. When the homogeneous mixture of the three ingredients has been completed, the ink is ready for use, and when written or stamped on cloth or the like, the asphaltum becomes incorporated in the fabric and will remain as long as the cloth lasts and retain its legibility.

As above stated, the ingredient mentioned for nullifying the natural odor of the ink is added after the ink has been prepared.

An ink of the character described will retain the dissolved asphaltum in suspension for an indefinite period of time and without deterioration.

The asphaltum is the marking element of the composition, the carbon tetrachlorid or its equivalent carbon bisulfid is employed as a solvent for the asphaltum, and the anilin oil or its equivalent is used to prevent corrosion of steel pens or the like and also tends to fix the solution against evaporization. The asphaltum employed is preferably the pure caked asphaltum found as a by-product of oil.

I claim:

1. An indelible liquid ink composed of an asphaltum base, a solvent for the same and anilin oil homogeneously mixed together.

2. An indelible liquid ink composed of an asphaltum base, a solvent for the same, anilin oil and a perfume.

3. An indelible ink comprising asphaltum and a solvent therefor in quantities respectively of about one dram of asphaltum to one ounce of the solvent, together with anilin oil in quantity about equal to one-half the quantity of the solution produced by the asphaltum and the solvent.

4. An indelible ink comprising asphaltum and a solvent therefor in quantities respectively of about one dram of asphaltum to one ounce of the solvent, together with anilin oil in quantity about equal to one-half the quantity of the solution produced by the asphaltum and the solvent, and enough methyl salicylate to scent the mixture of asphaltum solvent and oil.

In testimony whereof I affix my signature.

LOUIS W. LUSCHER.